US012438709B2

(12) United States Patent
Courtois et al.

(10) Patent No.: US 12,438,709 B2
(45) Date of Patent: Oct. 7, 2025

(54) KEY MANAGEMENT AND PROTECTION IN SECURE EXECUTION ENVIRONMENTS

(71) Applicant: QUALCOMM Incorporated, San Diego, CA (US)

(72) Inventors: Nicolas Thaddee Courtois, Mougins (FR); Frederic Amiel, Nice (FR)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 18/153,999

(22) Filed: Jan. 12, 2023

(65) Prior Publication Data

US 2024/0243908 A1    Jul. 18, 2024

(51) Int. Cl.
*H04L 9/08*    (2006.01)
(52) U.S. Cl.
CPC ........ *H04L 9/0861* (2013.01); *H04L 2209/04* (2013.01); *H04L 2209/08* (2013.01)
(58) Field of Classification Search
CPC   H04L 9/0861; H04L 2209/04; H04L 2209/08
See application file for complete search history.

(56) References Cited

U.S. PATENT DOCUMENTS

| 2011/0161670 | A1  | 6/2011 | Chase et al. | |
| 2017/0192907 | A1* | 7/2017 | Resch ................... | G06F 3/0644 |
| 2018/0218166 | A1* | 8/2018 | Cachin ................... | H04L 9/0891 |
| 2020/0177384 | A1* | 6/2020 | Iyer ........................ | G06F 21/44 |
| 2022/0376920 | A1  | 11/2022 | Aune | |

FOREIGN PATENT DOCUMENTS

EP    3648493 A1    5/2020

OTHER PUBLICATIONS

International Search Report and Written Opinion—PCT/US2023/085530—ISA/EPO—Apr. 2, 2024.

\* cited by examiner

*Primary Examiner* — Viet D Vu
(74) *Attorney, Agent, or Firm* — Polsinelli

(57) ABSTRACT

Systems and techniques are described herein for information protection. For example, a process may include obtaining a security information asset at a randomizing engine; performing a first randomization of the security information asset to obtain a randomized security information asset; providing the randomized security information asset to a secure storage device; obtaining the randomized security information asset from the secure storage device; performing a second randomization of the security information asset to obtain an updated randomized security information asset; and providing the updated randomized security information asset to a security component, wherein the updated randomized security information asset is used to perform a security operation.

30 Claims, 4 Drawing Sheets

KEY MANAGEMENT AND PROTECTION IN SECURE EXECUTION ENVIRONMENTS

FIELD

The present disclosure generally relates to a technique for protecting security information assets (e.g., cryptographic keys) using a secure execution environment. For example, aspects of the present disclosure relate to systems and techniques for randomization, masking, and re-masking of security information assets as they are obtained and used at computing devices.

BACKGROUND

Computing devices often employ various techniques to protect data. As an example, data may be subjected to encryption and decryption techniques in a variety of scenarios, such as writing data to a storage device, reading data from a storage device, writing data to or reading data from a memory device, encrypting and decrypting blocks and/or volumes of data, encrypting and decrypting digital content, performing inline cryptographic operations, etc. Such encryption and decryption operations are often performed, at least in part, using a security information asset, such as a cryptographic key, a derived cryptographic key, etc. Certain scenarios exist in which attacks are performed in an attempt to obtain such security information assets. Accordingly, it is often advantageous to implement systems and techniques to protect such security information assets.

SUMMARY

Systems and techniques are described herein for protecting security information assets on computing devices. According to some aspects of the present disclosure, a security information asset (e.g., a cryptographic key) may be protected, at least in part, using repeated randomizing, masking, and/or re-masking techniques as the security asset is transmitted or otherwise used on a computing device.

According to at least one example, a process for information protection is provided. The process includes: obtaining a security information asset at a randomizing engine; performing a first randomization of the security information asset to obtain a randomized security information asset; providing the randomized security information asset to a secure storage device; obtaining the randomized security information asset from the secure storage device; performing a second randomization of the security information asset to obtain an updated randomized security information asset; and providing the updated randomized security information asset to a security component, wherein the updated randomized security information asset is used to perform a security operation.

In another illustrative example, an apparatus for information protection is provided. The apparatus may include: at least one memory; and at least one processor coupled to the at least one memory and configured to: obtain a security information asset at a randomizing engine; perform a first randomization of the security information asset to obtain a randomized security information asset; provide the randomized security information asset to a secure storage device; obtain the randomized security information asset from the secure storage device; perform a second randomization of the security information asset to obtain an updated randomized security information asset; and provide the updated randomized security information asset to a security component, wherein the updated randomized security information asset is used to perform a security operation.

In another illustrative example, a non-transitory computer-readable medium is provided having stored thereon instructions that, when executed by at least one processor, cause the at least one processor to: obtain a security information asset at a randomizing engine; perform a first randomization of the security information asset to obtain a randomized security information asset; provide the randomized security information asset to a secure storage device; obtain the randomized security information asset from the secure storage device; perform a second randomization of the security information asset to obtain an updated randomized security information asset; and provide the updated randomized security information asset to a security component, wherein the updated randomized security information asset is used to perform a security operation.

According to at least one example, an apparatus for information protection is provided. The apparatus comprises: means for obtaining a security information asset at a randomizing engine; means for performing a first randomization of the security information asset to obtain a randomized security information asset; means for providing the randomized security information asset to a secure storage device; means for obtaining the randomized security information asset from the secure storage device; means for performing a second randomization of the security information asset to obtain an updated randomized security information asset; and means for providing the updated randomized security information asset to a security component, wherein the updated randomized security information asset is used to perform a security operation.

In some aspects, one or more of the apparatuses described herein is, is part of, and/or includes a mobile or wireless communication device (e.g., a mobile telephone or other mobile device), an extended reality (XR) device or system (e.g., a virtual reality (VR) device, an augmented reality (AR) device, or a mixed reality (MR) device), a wearable device (e.g., a network-connected watch or other wearable device), a vehicle or a computing device or component of a vehicle, a camera, a personal computer, a laptop computer, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), a system-on-a-chip (SoC), any combination thereof, and/or other type of device. In some aspects, the apparatus(es) include(s) a display for displaying one or more images, notifications, and/or other displayable data. In some aspects, the apparatus(es) include(s) can include one or more sensors (e.g., one or more RF sensors), such as one or more gyroscopes, one or more gyrometers, one or more accelerometers, any combination thereof, and/or other sensor(s).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
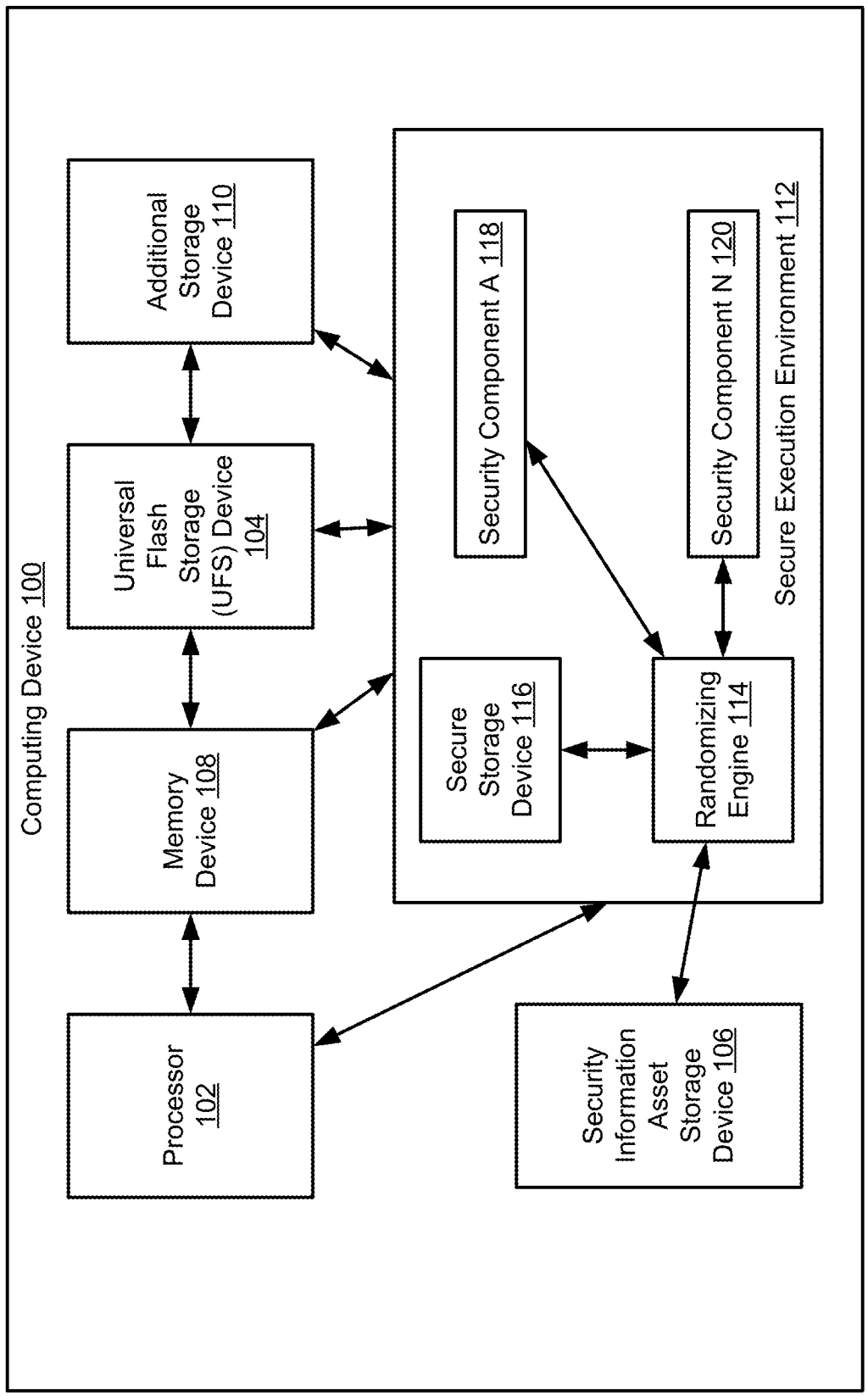
FIG. 1 is a block diagram illustrating certain components of a computing device, in accordance with some examples.

Certain aspects and examples of this disclosure are provided below. Some of these aspects and examples may be applied independently and some of them may be applied in combination, as would be apparent to those of skill in the art. In the following description, for the purposes of explanation, specific details are set forth in order to provide a thorough understanding of examples of the application. However, it will be apparent that various examples may be practiced without these specific details. The figures and description are not intended to be restrictive. Additionally, certain details known to those of ordinary skill in the art may be omitted to avoid obscuring the description.

In the below description of the figures, any component described with regard to a figure, in various examples described herein, may be equivalent to one or more like-named (or numbered) components described with regard to any other figure. For brevity, descriptions of these components may not be wholly repeated with regard to each figure. Thus, each and every example of the components of each figure is incorporated by reference and assumed to be optionally present within every other figure having one or more like-named components. Additionally, in accordance with various examples described herein, any description of the components of a figure is to be interpreted as an optional example, which may be implemented in addition to, in conjunction with, or in place of the examples described with regard to a corresponding like-named component in any other figure.

The ensuing description provides illustrative examples only, and is not intended to limit the scope, applicability, or configuration of the disclosure. Rather, the ensuing description of the illustrative examples will provide those skilled in the art with an enabling description for implementing an exemplary example. It should be understood that various changes may be made in the function and arrangement of elements without departing from the spirit and scope of the application as set forth in the appended claims.

As used herein, the phrase operatively connected, or operative connection (or any variation thereof), means that there exists between elements/components/devices, etc. a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection. Additionally, operatively connected devices and/or components may exchange things, and/or may inadvertently share things, other than information, such as, for example, electrical current, radio frequency signals, power supply interference, interference due to proximity, interference due to re-use of the same wire and/or physical medium, interference due to re-use of the same register and/or other logical medium, etc.

Systems, apparatuses, processes (also referred to as methods), and computer-readable media (collectively referred to as "systems and techniques") are described herein for protecting security information assets (e.g., cryptographic keys) during a variety of scenarios as the security information assets are transferred, stored, and/or otherwise used on a computing device. Security information assets may be used to perform security operations for data on computing devices. As an example, a security information asset may be a cryptographic key used for encrypting and/or decrypting data used by a computing device. Such a security information asset may be stored in a security information asset storage device (e.g., one time programmable (OTP) storage, non-volatile memory device, flash storage device, etc.). Security information assets may be obtained from the security information asset storage device during execution of a computing device (e.g., at boot and/or re-boot), stored in a separate storage device, and provided as needed to securing components (e.g., cryptographic engines, key tables, key derivation functions, etc.) for performing security operations (e.g., encryption and/or decryption of data). Security information assets so obtained may be directly used by any number of security components and/or may be used for deriving additional security information assets (e.g., derived keys used by cryptographic engines for encrypting and/or decrypting data), which is an example of a security operation. Other examples of security operations include steps, transformations, etc., as discussed further herein.

However, repeated reuse of security information assets may allow an attacker to use various techniques to obtain all or any portion of a security information asset, which may potentially compromise the security of a computing device. As an example, an attacker may perform a side channel attack by using a measurement device (e.g., an oscilloscope) to measure any number of characteristics of a computing device as it operates (e.g., voltages, power, electromagnetic outputs, timing information, sound, temperature, etc.). As another example, an attacker may employ fault injection techniques. Such attacks may be of limited use when performed once, or a relatively few number of times, but may have increased effectiveness when performed a larger number of times. As such, security information assets become more vulnerable while being reused when such techniques are being used. As an example, measuring one or more characteristics of the operation of a computing device when operations transferring security information assets are performed, or when performing operations using security information assets, etc. may allow an attacker to obtain all or any portion of a security information asset, thereby potentially compromising the security of the computing device. As an example, an attacker using a side channel attack or a fault injection attack repetitively as a cryptographic key is being transmitted and/or received (e.g., when obtained from a security information asset storage device at boot time, when obtained from a different storage device, when provided to security components for use in performing cryptographic operations, etc.), used to derive other cryptographic keys, etc. may be able to deduce the cryptographic key, and thus be able to use the key to decrypt data on the computing device and/or encrypt potentially malicious data using the correct key, which may then be used by the computing device.

In some examples, a security information asset is obtained from a security information asset storage device. As an example, a security information asset may be obtained from a security information asset storage device when a computing device boots and/or reboots to be used for various security operations (e.g., encryption and/or decryption operations, key derivation operations, other steps or transformations performed using a security information asset, etc.). In some examples, the security information asset is obtained at a randomizing engine. In some examples, a randomizing engine is any hardware, software, firmware, or any combination thereof that exists within a secure execution environment of a computing device. In some examples, a secure execution environment is any portion of a computing device that is a secure area of the computing device. Examples of secure execution environments include, but are not limited to, trusted management environments, trusted execution environments, trust zones, trusted platform modules, secure elements, etc. In some examples, the security information asset storage device is a read only storage device, such as a read-only memory device, a one time programmable storage device, etc. In some examples, the security information asset storage device is a re-programmable storage device such as a non-volatile memory device, a flash storage device, etc. In some examples, a security information asset may be obtained one time from the storage information asset storage device once per boot or reboot of a computing device.

A security information asset (e.g., a cryptographic key) may be stored on a security information asset storage device in a masked form or an unmasked form. In some examples, masking of data refers to a process of obfuscating the content of a data item by performing a masking procedure. Any suitable form of data masking may be used without departing from the scope of examples described herein. In some examples, masking of data refers to altering the data represented in binary form such that if read by any entity not configured to understand the mask applied, the data does not represent the original data (e.g., the security information asset), but that an entity (e.g., a cryptographic engine) configured to be aware of the masking is capable of unmasking, and subsequently using, the original data (e.g., a cryptographic key). Examples of data masking procedures include, but are not limited to, techniques such as substitution, data shuffling, addition of data to the original data, using various parameters (e.g., date, time, etc.) to alter data, splitting and randomizing transmission order of data, splitting the data into separate portions and adding additional data to each (e.g., random numbers), a combination of all or any portion of the aforementioned techniques, etc.

In some aspects, the security information asset is stored on the security information asset storage device in a masked form. In some examples, if the security information asset obtained by the randomizing engine is already masked, the data may be subjected to a re-masking process performed by the randomizing engine. In some examples, a re-masking process includes performing an additional masking process on the security information asset. In some examples, the security information asset stored on the security information asset storage device is not in a masked form. In such examples, the randomizing engine, after obtaining the security information asset from the security information asset storage device, may perform an initial masking process on the security information asset. In some examples, masking and/or re-masking is performed using random bits or another quantity derived from the internal state of the device, which can then be stored or transmitted securely and protected in the same way as the original asset, or which is protected by physical boundaries, limitations of use and access, and limited privileges or abilities of different internal components In some cases, the security information asset obtained by the randomizing engine, whether or not masked and/or re-masked, may be randomized during transmission to a secure storage device. A secure storage device may be any form of data storage device that exists within a secure execution environment. The secure storage device may exist within the same secure execution environment of a computing device as the randomizing engine, or may exist within a different secure execution environment of the computing device. In some examples, randomization of a security information asset during transmission includes randomizing the order in which portions (e.g., bytes) of the security information asset are transmitted within a computing device. In some examples, the randomization of transmission could be done at randomized time intervals to avoid their decoding by an attacker. In some examples, dummy operations or fake data packets could be added to this transmission process which would be rejected as having an invalid format or range or data content, but would confuse an eavesdropping attacker. In some examples dummy operations could be done in parallel to the real operation by another functional unit of the same type. As an example, rather than transmitting portions (e.g., bytes) of a security information asset to a secure storage device in the order in which the portions exist, the portions may be subjected to a randomization process whereby the order in which the portions are transmitted may differ each time the security information asset is transmitted. In some examples, a security information asset subjected to a randomization process by a randomizing engine may be referred to as a randomized security information asset.

In some examples, the randomized security information asset, which, as discussed above, may or may not have also been masked or re-masked by the randomizing engine, is stored at a secure storage device within a secure execution environment of a computing device. In some examples, the secure storage device includes a key table, used for storing cryptographic keys to be used by security components of the computing device as needed to perform cryptographic operations (e.g., encryption and/or decryption of data). In some examples, while stored in the secure storage device, randomized security information assets may be subjected to an enforced process for re-masking. In some examples, the enforced re-masking is based on one or more thresholds related to the quantity of times that all or any portion of a security information asset has been read and/or written. As an example, one or more counters may be included in a computing device that are updated each time a portion of a security information asset is read and/or written. Such counters may track individual portions (e.g., bytes) of the security information asset, and/or may track an aggregate number of reads and/or writes of the portions of the security information asset. In some examples, if the aggregate number of reads and/or writes of all or any portion of the security information asset exceed a threshold (e.g., a usage threshold), a re-masking of the security information asset may be initiated, or a canceling of the use of the security information asset may be performed. In some examples, a computing device may be configured with a usage discrepancy threshold, which is a threshold relating to any discrepancy between the reading and/or writing of one or more portions (e.g., bytes) of a security information asset relative to one or more other portions of the security information asset. As an example, if the first byte of a cryptographic key has experienced a quantity of reads that is substantially above (e.g., above the usage discrepancy threshold) other bytes of the security information asset, a potential attack on the security information asset may be detected, at which point the use of the cryptographic asset may be discontinued and/or a re-masking may be initiated.

In some aspects, as discussed above, security components of a computing device may require a security information asset (e.g., a cryptographic key) to perform one or more security operations (e.g., encrypting and/or decrypting data, generating derivative cryptographic keys, any other steps and or transformations performed using a security information asset, etc.). In such examples, the randomizing engine obtains the security information asset, which may have been randomized, masked by the randomizing engine, re-masked by the randomizing engine, and/or re-masked any number of times while stored in the secure storage device, from the secure storage device. In some examples, after obtaining the security information asset, the randomizing engine may or may not perform a re-masking process to re-mask the security information asset. Additionally or alternatively, when providing the security information asset to one or more security components, the randomizing engine may perform an additional randomization process, such that the order in which the portions (e.g., bytes) of the security information asset are again randomized during transmission to the one or more security components. Such randomization may transmit the positions of the security information asset in a randomized order, but be stored and/or otherwise comprehended by the security component in a non-randomized order, un-masked, and then used to perform any number of security operations (e.g., encryption and/or decryption, derivative key generation, any other steps and or transformations performed using a security information asset, etc.) for data on a computing device.

In some cases, the initial masking or re-masking of a security information asset, randomization of the security information asset while it is transmitted, and periodic re-masking may occur for all or any portion of any number security information assets (e.g., master cryptographic keys, derived cryptographic keys, etc.) for all transfers of the security information asset. As such, the randomizing engine may function as a firewall through which security information assets pass when being transferred (e.g., from an initial storage location to a key table, from a key table to a security component, etc.). Such transfers may occur for a variety of reasons, including, but not limited to, reads, writes, shadowing, duplication, parallel re-use, deterministic re-calculations, etc. In some examples, while the randomizing engine may perform randomization, masking, and/or re-masking of security information assets, the security information assets are not stored at the randomizing engine. In some cases, the randomizing engine may be a hardware component that includes circuitry configured to perform randomization and/or masking processes.

Examples described herein address the need for providing improved security for security information assets. In some examples, masking and/or re-masking of security information assets obtained from a security information asset storage device (e.g., during a boot and/or reboot of a computing device), randomizing the order of transmission of portions of the security information asset to a secure storage device, enforced periodic re-masking of the security information asset (e.g., based on one or more counters related to usage thresholds and/or usage discrepancy thresholds), re-masking of the security information asset when obtained by the randomizing engine to be provided to one or more security components, and/or randomization of the transmission of the security information asset to the one or more security components may improve the security of a computing device. Such improvement may be related to causing the content of data to be randomized, masked and/or re-masked during all or any portion of the use of a security information asset as it traverses a path from a security information asset storage device to a randomizing engine, then to a secure storage device, then back to the randomizing engine, and ultimately to one or more security components for use in performing any number of security operations. Such a series of randomizing, masking, re-masking, etc. along the data path may obfuscate the security information asset such that attackers (e.g., performing side channel attacks, fault injection attacks, etc.) may be less likely to discern all or any portion of the security information asset, and, as such, be less able to compromise the security of a computing device.

Various aspects of the techniques described herein will be discussed below with respect to the figures. FIG. 1 is a block diagram illustrating an example of a computing device 100. As shown, the computing device 100 includes a processor 102, a universal flash storage (UFS) device 104, a security information asset storage device 106, a memory device 108, an additional storage device 110, and a secure execution environment 112. In some examples, the secure execution environment 112 includes a randomizing engine 114, a secure storage device 116, and any number of security components (e.g., security component A 118, security component N 120). Each of these components is described below.

The computing device 100 is any device, portion of a device, or any set of devices capable of electronically processing instructions and may include, but is not limited to, any of the following: one or more processors (e.g. components that include integrated circuitry, memory, input and output device(s) (not shown), non-volatile storage hardware, one or more physical interfaces, any number of other hardware components (not shown), and/or any combination thereof. Examples of computing devices include, but are not limited to, a mobile device (e.g., laptop computer, smart phone, personal digital assistant, tablet computer, automobile computing system, and/or any other mobile computing device), an Internet of Things (IoT) device, a server (e.g., a blade-server in a blade-server chassis, a rack server in a rack, etc.), a desktop computer, a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a wearable device (e.g., a network-connected watch or smartwatch, or other wearable device), a robotic device, a smart television, a smart appliance, an extended reality (XR) device (e.g., augmented reality, virtual reality, etc.), any device that includes one or more SoCs, and/or any other type of computing device with the aforementioned requirements. In one or more examples, any or all of the aforementioned examples may be combined to create a system of such devices, which may collectively be referred to as a computing device. Other types of computing devices may be used without departing from the scope of examples described herein.

In some examples, the processor 102 is any component that includes circuitry for executing instructions (e.g., of a computer program). As an example, such circuitry may be integrated circuitry implemented, at least in part, using transistors implementing such components as arithmetic logic units, control units, logic gates, registers, first-in, first-out (FIFO) buffers, data and control buffers, etc. In some examples, the processor may include additional components, such as, for example, cache memory. In some examples, a processor retrieves and decodes instructions, which are then executed. Execution of instructions may include operating on data, which may include reading and/or writing data. In some examples, the instructions and data used by a processor are stored in the memory (e.g., memory device 108) of the computing device 100. A processor may perform various operations for executing software, such as operating systems, applications, etc. The processor 102 may cause data to be written from memory to storage of the computing device 100 and/or cause data to be read from storage via the memory. Examples of processors include, but are not limited to, central processing units (CPUs), graphics processing units (GPUs), neural processing units, tensor processing units, display processing units, digital signal processors (DSPs), finite state machines, etc. The processor 102 may be operatively connected to the memory device 108, any storage (e.g., UFS device 104, additional storage device 110) of the computing device 100, and/or to the secure execution environment 112. Although FIG. 1 shows the computing device 100 having a single processor 102, the computing device may include any number of processors without departing from the scope of examples described herein.

In some examples, the computing device 100 includes a UFS device 104. In some examples, the UFS device 104 is a flash storage device conforming to the UFS specification. The UFS device 104 may be used for storing data of any type. Data may be written to and/or read from the UFS device 104. As an example, the UFS device may store operating system images, software images, application data, etc. The UFS device 104 may store any other type of data without departing from the scope of examples described herein. In some examples, the UFS device 104 includes NAND flash storage. The UFS device 104 may use any other type of storage technology without departing from the scope of examples described herein. In some examples, the UFS device 104 is capable of data rates that are relatively faster than other storage devices (e.g., additional storage device 110) of the computing device 100. The UFS device 104 may be operatively connected to the processor 102, the memory device 108 and/or the additional storage device 110. Although FIG. 1 shows the computing device 100 having a single UFS device 104, the computing device may include any number of UFS devices without departing from the scope of examples described herein. Additionally, although FIG. 1 shows the UFS device 104, the computing device 100 may include any other type of flash storage device without departing from the scope of examples described herein.

In some examples, the computing device 100 includes an additional storage device 110. In some examples, the additional storage device is a non-volatile storage device. The additional storage device 110 may for example, be a persistent memory device. In some examples, the additional storage device 110 may be computer storage of any type. Examples of type of computer storage include, but are not limited to, hard disk drives, solid state drives, flash storage, tape drives, removable disk drives, Universal Serial Bus (USB) storage devices, secure digital (SD) cards, optical storage devices, read-only memory devices, etc. Although FIG. 1 shows the additional storage device 110 as part of the computing device 100, the additional storage device may be separate from and operatively connected to the computing device 100 (e.g., an external drive array, cloud storage, etc.). In some examples, the additional storage device 110 operates at a data rate that is relatively slower than the UFS device 104. In some examples, the additional storage device 110 is also a UFS storage device. In some examples, the additional storage device 110 is operatively connected to the processor 102, the UFS device 104, the secure execution environment 112, and/or the memory device 108. Although FIG. 1 shows the computing device 100 having a single additional storage device 110, the computing device 100 may have any number of additional storage devices without departing from the scope of examples described herein.

In some examples, the computing device 100 includes a memory device 108. The memory device may be any type of computer memory. In some examples, the memory device 108 is a volatile storage device. As an example, the memory device 108 may be random access memory (RAM). In one or more examples, data stored in the memory device 108 is located at memory addresses, and is thus accessible to the processor 102 and/or the secure execution environment 112 using the memory addresses. Similarly, the processor 102 and/or secure execution environment (or components therein) may write data to and/or read data from the memory device 108 using the memory addresses. The memory device 108 may be used to store any type of data, such as, for example, computer programs, the results of computations, etc. In some examples, the memory device 108 is operatively connected to the processor 102, the UFS device 104, the additional storage device 110, and the secure execution environment 112. Although FIG. 1 shows the computing device 100 having a single memory device 108, the computing device 100 may have any number of memory devices without departing from the scope of examples described herein.

In some examples, the computing device 100 includes the security information asset storage device 106. In some examples, the security information asset storage device 106 is any storage device configured to store security information assets (e.g., cryptographic keys). In some examples, the security information asset storage device 106 is where security information assets are stored and initially obtained from when needed for use on a computing device (e.g., at boot and/or reboot). Examples of a security information asset storage device include, but are not limited to, various types of read-only memory, one time programmable memory devices (e.g., one time programmable fuses or other types of one time programmable memory devices), non-volatile memory, etc. The security information asset storage device 106 may be operatively connected to the secure execution environment 112. Although FIG. 1 shows the computing device 100 as including a single security information asset storage device 106, the computing device 100 may include any number of security information asset storage devices without departing from the scope of embodiments described herein.

In some examples, the computing device 100 includes any number of security components (e.g., the security component 118, the security component 120). The security components 118 and 120 may be any component capable of performing various cryptographic services, and may thus be any hardware (e.g., circuitry), software, firmware, or any combination thereof. In some examples, the security components are a sub-chip hardware components of a system on a chip (SoC), which may include other components shown in FIG. 1 such as, for example, the processor 102. Any other components of the computing device 100 may also be included as part of an SoC without departing from the scope of examples described herein. In some examples, the security components exists in a data path between storage devices (e.g., UFS storage device 104, additional storage device 110) and the memory device 108, and/or data paths between the processor 102 and the memory device 108 or any of the storage devices (e.g., 104, 110). In some examples, all or any portion of the security components may be considered "inline" cryptographic engines. In some examples, the security components (e.g., 118, 120) are configured to perform any number of cryptographic service types on data being read from or written to a storage device (e.g., UFS device 104, additional storage device 110) and/or a memory device 108 of the computing device 100. In some examples, all or any portion of the data passing from memory to storage, from storage to memory, or to or from the processor 102 of the computing device 100 passes through a security component (e.g., 118, 120).

Examples of cryptographic service types that may be performed include, but are not limited to, encrypting data, decrypting data, key derivation, performing data integrity verification, and performing authenticated encryption and decryption. In some examples, the security components 118 and 120 are configured to perform the various cryptographic service types by being configured to execute one or more cryptographic algorithms. As an example, to perform encryption and decryption, one or more security components (e.g., 118, 120) may be configured to execute one or more of the Advanced Encryption Standard XOR-encrypt-XOR Tweakable Block Ciphertext Stealing (AES-XTS) algorithm, the AES-Cypher Block Chaining (AES-CBC) algorithm, the AES-Electronic Codebook (AES-EBC) algorithm, the Encrypted Salt-Sector Initialization Vector-AES-CBC (ESSIV-AES-CBC) algorithm, etc., including any variants of such algorithms (e.g., 128 bits, 192 bits, 256 bits, etc.). As another example, to perform integrity verification, the security component (e.g., 118, 120) may be configured to execute a hash algorithm such as, for example, the one or more members of the SHA family of hash algorithms. As another example, to perform authenticated encryption, a security component (e.g., 118, 120) may be configured to perform the AES-Galois/Counter Mode (GCM) algorithm. The security component (e.g., 118, 120) may be configured to execute any other cryptographic algorithms without departing from the scope of examples described herein. In some examples, in order to perform at least a portion of the aforementioned cryptographic service types, a security component may require one or more security information assets (e.g., cryptographic keys), which may be provided as needed by the randomizing engine 114 (described below) after being obtained from the security information asset storage device 106 and in some cases after additional transformations. The additional transformations can be, but are not limited to, masking, re-masking, removing or adjusting the masking scheme to the recipient encoding, key derivation, re-ordering, adding dummy data elements, adding security policy bits specifying the actions which are not allowed to be performed, entities, channels or IDs allowed to read or manipulate this asset, adding state bits relating to past history of handling this asset, timestamps, counters, and authentication tokens, or any combination thereof.

In some examples, the computing device 100 includes the secure execution environment 112. In some examples, the secure execution environment 112 is a hardware component (e.g., including circuitry) that may execute software and/or firmware, and is configured to perform various services to secure the computing device 100 (e.g., by verifying confidentiality and/or integrity of data being used by the computing device 100). Such services may include, but are not limited to, performing various operations for executing the aforementioned cryptographic service types, configuring protection units, configuring and/or otherwise interacting with cryptographic hardware units, etc. Examples of secure execution environments include, but are not limited to, trusted management environments, trusted execution environments, trust zones, trusted platform modules, secure elements, etc. The secure execution environment 112 may be operatively connected to the processor 102, the UFS device 104, the security information asset storage device 106, the additional storage device 110, and/or the memory device 108. Although FIG. 1 shows the computing device 100 as having a single secure execution environment 112, the computing device 100 may include any number of secure execution environments without departing from the scope of examples described herein. Additionally, although FIG. 1 shows a variety of components (described below) as being included in a single secure execution environment 112, all or any portion of the components shown within the secure execution environment 112 may be in different secure execution environments (not shown) of the computing device 100, and/or not in a secure execution environment (e.g., being part of a rich execution environment).

In some examples, the secure execution environment 112 includes the randomizing engine 114. In some examples, the randomizing engine 114 is any hardware (e.g., circuitry), software, firmware, or any combination thereof configured to perform randomization and/or masking or re-masking processes on security information assets as said assets are transmitted between various locations of the computing device 100. As an example, the randomizing engine 114 may be circuitry configured to randomize, mask, and/or re-mask cryptographic keys as they are transmitted within the computing device 100. The randomizing engine 114 may be operatively connected to the security information asset storage device 106, the secure storage device 116, and any number of security components (e.g., 118, 210). As discussed above, a randomization process may include randomizing the order of portions (e.g., bytes) of a security information asset as it is transmitted within the computing device 100. Such randomization may be performed by the randomizing engine 114 after initially obtaining the security information asset from the security information asset storage device 106 and then transmitting the randomized security information asset to the secure storage device 116. Such randomization may also be performed again after obtaining the security information asset from the secure storage device 116 and then transmitting the updated randomized security information asset to one or more security components (e.g., 118, 120).

Additionally or alternatively, as discussed above, the randomizing engine 114 may perform masking and/or re-masking processes on security information assets. In some examples, a masking and/or re-masking process refers to a process of obfuscating the content of a data item by performing a masking procedure. Any suitable form of data masking may be used without departing from the scope of examples described herein. In some examples, masking of data refers to altering the data represented in binary form such that if read by any entity not configured to understand the mask applied, the data does not represent the original data (e.g., the security information asset), but that an entity (e.g., a security component) configured to be aware of the masking is capable of unmasking, and subsequently using, the original data (e.g., a cryptographic key). Examples of data masking procedures include, but are not limited to, techniques such as substitution, data shuffling, addition of data to the original data, using various parameters (e.g., date, time, etc.) to alter data, splitting and randomizing transmission order of data, splitting the data into separate portions and adding additional data to each (e.g., random numbers), a combination of all or any portion of the aforementioned techniques, etc.

In some examples, if a security information asset stored in the security information asset storage device 106 is already masked when obtained by the randomizing engine 114, the randomization may not perform a re-masking process. In some examples, the randomizing engine 114 may be configured to perform a re-masking operation even if the security information asset obtained from the security information asset storage device 106 was already masked. In some examples, if the security information asset obtained from the security information asset storage device 106 is not masked, the randomizing engine 114 performs a masking process, which may occur before or after the aforementioned randomization for transmission to the secure storage device.

In some examples, the randomizing engine 114 is also the entity that obtains or is otherwise provided security information assets from the secure storage device as they are needed by one or more security components (e.g., 118, 120) during the operation of the computing device 100. Similar to the randomization and re-masking described above when the randomizing engine 114 obtains a security information asset from the security information asset storage device 106, the randomizing engine may perform a randomization and/or re-masking process on the security information asset after it is received from the secure storage device, and then transmit the randomized and/or re-masked security information asset to one or more security components (e.g., 118, 120). Thus, a particular security information asset may be repetitively masked, re-masked, and/or randomized from transmission as the security information asset traverses from the security information asset storage device 106 to the secure storage device 116 via the randomizing engine 114, and again as the security information asset traverses from the secure storage device 116 to one or more security components (e.g., 118, 120) via the randomizing engine 114 any number of times. In some examples, the repeated randomization and/or re-masking of the security information asset as it is transmitted within the computing device 100 helps protect the security information asset from attacks (e.g., side channel attacks, fault injection attacks, etc.), as the portions of the security information asset being transmitted are not in the same order, and may also have been repetitively re-masked.

Additionally, although FIG. 1 shows the computing device 100 as having a single randomizing engine 114, the computing device 100 may include any number of randomizing engines, grouped in groups of one or more in any number of secure execution environments of the computing device 100, without departing from the scope of examples described herein.

In some examples, the secure execution environment 112 also includes a secure storage device 116. In some examples, the secure storage device 116 is any type of storage device that exists within a secure execution environment of the computing device 100. Although FIG. 1 shows the secure storage device as existing within the same secure execution environment 112 as the randomizing engine 114 and one or more security components (e.g., 118, 120), the secure storage device may be in a separate secure execution environment (not shown) operatively connected to the secure execution environment 112. In some examples, the secure storage device 116 is operatively connected to the randomizing engine 114. In some examples, the secure storage device 116 is configured to store any number of security information assets. As an example, the secure storage device 116 may include a key table for storing any number of cryptographic keys. In some examples, a key table is a data structure of any type capable of storing any number of cryptographic keys In some examples, the secure storage device 116 may include and/or be operatively connected to any number of counters (not shown). In some examples, a counter is any hardware (e.g., circuitry), software, firmware, or any combination thereof that is configured to store the number of times a particular event or process has occurred. In some examples, one or more counters included in and/or operatively connected to the secure storage device are configured to track operations (e.g., reads, writes, etc.) performed with security information assets. Such counters may track the number of times all or any portion (e.g., one or more bytes) of a security information asset has been read, written, or otherwise accessed or used. In some examples, the counters may be used to initiate enforcement of a periodic re-masking process for security information assets stored in the secure storage device 116. As an example, the computing device 100 may be configured with a usage threshold. In some examples, a usage threshold is a threshold number of times that all or any portion of a security information asset has been read, written, etc. that, if exceeded, initiates a re-masking process of the security information asset stored in the secure storage device 116. As another example, the computing device 100 may be configured with a usage discrepancy threshold. In some examples, a usage discrepancy threshold is a threshold amount of discrepancy between operations (e.g., reads, writes, etc.) performed on one portion of a security information asset (e.g., one or more bytes) relative to another portion of the security information asset (e.g., one or more bytes). In some examples, if the usage discrepancy threshold is exceeded, a re-masking process may be triggered for the security information asset stored in the secure storage device 116. In some examples, if either of the aforementioned thresholds are exceeded one or more times, the computing device 100 may be configured to cancel usage of the security information asset.

While FIG. 1 shows a certain number of components in a particular configuration, one of ordinary skill in the art will appreciate that the computing device 100 may include more components or fewer components, and/or components arranged in any number of alternate configurations without departing from the scope of examples described herein. Additionally, although not shown in FIG. 1, one of ordinary skill in the art will appreciate that the computing device 100 may execute any amount or type of software or firmware (e.g., bootloaders, operating systems, hypervisors, virtual machines, computer applications, mobile device apps, etc.). Accordingly, examples disclosed herein should not be limited to the configuration of components shown in FIG. 1. The components shown in FIG. 1 mayor may not be discrete components. In some aspects, one or more of the components can be combined into different hardware elements, implemented in software, and/or otherwise implemented using software and/or hardware. As used herein, the term device may be a discrete component or apparatus, or may not be a discrete component. In some aspects, other devices can exist within, be part of, and/or utilize the same hardware components as a device.

Figure 2:
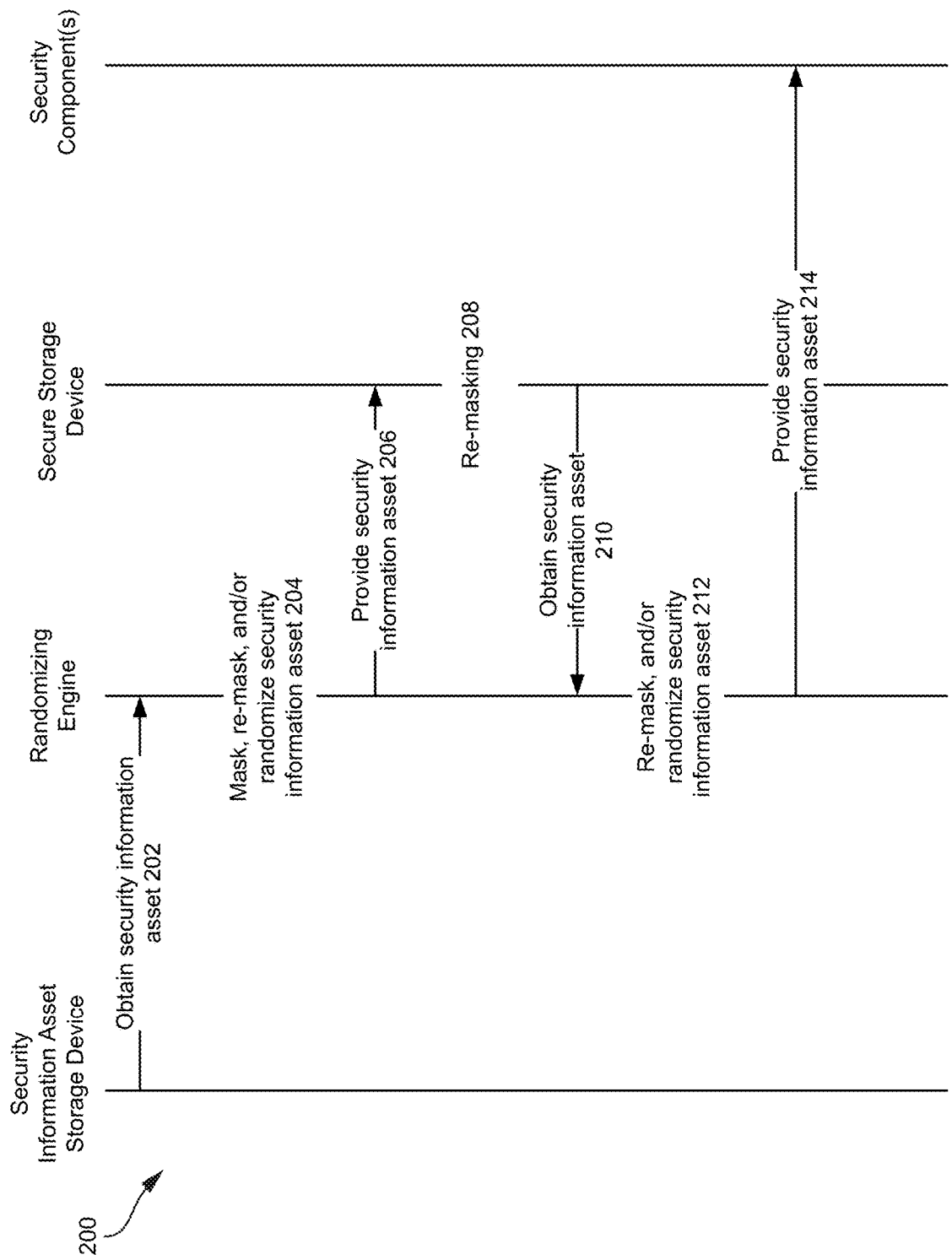
FIG. 2 is a diagram illustrating a flow for protecting security information assets, in accordance with some examples.

FIG. 2 illustrates an example flow 200 in accordance with one or more examples described herein. The following example is for explanatory purposes only and not intended to limit the scope of examples described herein. Additionally, while the example shows certain aspects of examples described herein, all possible aspects of such examples may not be illustrated in this particular example.

In some examples, a computing device (e.g., the computing device 100 of FIG. 1), or any portion thereof (e.g., a sub-system) is configured to use security components (e.g., 118 and 120 shown in FIG. 1 and described above). In such a scenario, one or more security information assets are initially stored on a security information asset storage device (e.g., the security information asset storage device 106 shown in FIG. 1 and described above). When the computing device is booted, rebooted, and/or at other times during operation of the computing device, a particular security information asset is obtained from the security information asset storage device by a randomizing engine (e.g., at operation 202 shown in FIG. 2), and may also be duplicated in any number of memory device locations and/or registers of a computing device.

After obtaining the security information asset from the security information asset storage device in operation 202, in some cases, the randomizing engine (e.g., the randomizing engine 114 shown in FIG. 1 and described above) may perform one or more operations using the security information asset at operation 204. One example operation is to randomize the order of the portions (e.g., bytes) of the security information asset, and transmitting the security information asset in the randomized order to a secure storage device (e.g., the secure storage device 116 shown in FIG. 1 and described above) of a secure execution environment (e.g., the secure execution environment 112 shown in FIG. 1 and described above) in operation 206. The randomizing engine may additionally perform a masking or re-masking process on the security information asset. If the security information asset is already masked, a re-masking process may or may not be performed. If the security information asset is not masked, then a masking process may be performed. After the masking, re-masking, and/or randomization is performed by the randomizing engine, in some examples, the security information asset is provided to the secure storage device by the randomizing engine at operation 206.

At operation 208, re-masking is performed while the security information asset is stored at the secure storage device. In this example, the computing device is configured with both a usage threshold and a usage discrepancy threshold each of which are tracked by counters operatively connected to the secure storage device. In one illustrative example, the usage threshold can be configured at 10, and a re-masking can be triggered any time all or any portion of a particular security information asset exceeds the threshold in total quantity of reads and writes. In another illustrative example, the usage discrepancy threshold can be configured at 50, and a re-masking can be triggered any time any portion (e.g., any one or more bytes) of security information asset are read and written 50 times more than other portions of the security information asset. In some cases, the computing device can include another counter that tracks the number of times that the two thresholds have been exceeded. In such cases, if the two thresholds have been exceeded more than 10 times, the use of the particular security information asset is canceled on the computing device. In some examples, the re-masking is performed when (e.g., only when) the security information asset is transferred back to the randomizing engine (discussed below), with the periodic re-masking of the security information asset while stored in the secure storage device being an optional feature. In some aspects, the counters are configured to be incremented automatically regardless of system events that occur.

At operation 210, one or more security components may require the security information asset for performing one or more cryptographic services on the computing device. The randomizing engine can again obtain the security information asset, which may have been masked or re-masked before being sent to the secure storage device, randomized for transmission to the secure storage device as a randomized security information asset, and periodically subjected to enforced re-masking based on counter thresholds while stored in the secure storage device.

The randomizing engine can then perform another re-masking of the security information asset, and can again randomize the order of transmission of the various portions (e.g., bytes) of the security information asset at operation 212.

After being initially obtained from the security information asset storage device by the randomizing engine at operation 202, the security information asset is masked and/or re-masked, randomized at operation 204, transmitted to the secure storage device as a randomized security information asset at operation 206, periodically re-masked while stored in the secure storage device at operation 208, obtained from the secure storage device by the randomizing engine at operation 210, and re-masked and again randomized at operation 212. At operation 214, the security information asset is provided to one or more security components.

Based on the above-described flow 200, transmissions of the security information asset within the computing device after the initial obtaining of the security information asset from the security information asset storage device are performed after randomization of the security information asset, and the security information asset is masked and re-masked for transmission, and re-masked while stored. Such a flow may provide protection against side channel and fault injection attacks by ensuring that the security information asset was constantly in a different state (e.g., random transmission order for bytes, repetitive re-masking), thereby rendering moot attempts to discern the content of the security information asset.

Figure 3:
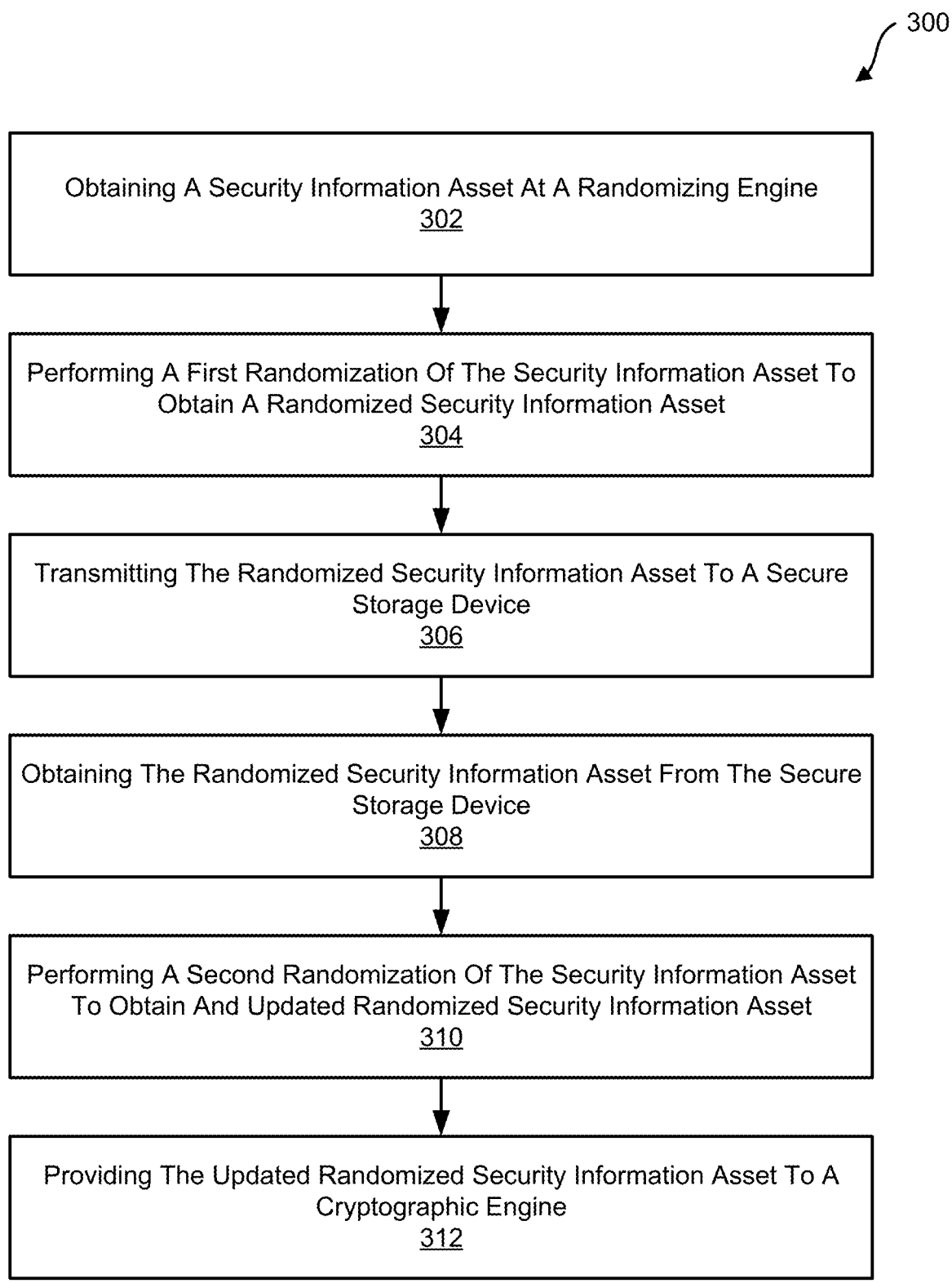
FIG. 3 is a flow diagram illustrating an example process for protecting security information assets, in accordance with some examples.

FIG. 3 is a flow diagram illustrating an example of a process 300 for image authentication for secure boot in accordance with one or more examples described herein. The process 300 may be performed, at least in part, for example, by the computing device 100 shown in FIG. 1 and described above, or any component therein, such as, for example, the randomizing engine 114.

At block 302, the process 300 includes obtaining a security information asset at a randomizing engine (e.g., the randomizing engine 114 of FIG. 1). In some examples, the security information asset is a cryptographic key. In some examples, the security information asset is obtained from a security information asset storage device (e.g., the security information asset storage device 106 of FIG. 1). The security information asset may or may not be masked when obtained.

At block 304, the process 300 includes performing a first randomization of the security information asset to obtain a randomized security information asset. The first randomization may be performed, as an example, by the randomizing engine 114 of FIG. 1. Randomization is discussed above in the description of FIG. 1 and FIG. 2. As an example, randomization may include randomizing the order of the portions (e.g., bytes) of the security information asset before and/or during any transmission of the security information asset. In some examples, in addition to randomization, the security information asset may be masked or re-masked. In some examples, if the obtained security information asset was not masked when obtained, it may be masked by the randomizing engine. In some examples, if the obtained security information asset was masked when obtained, a re-masking may be performed by the randomizing engine. In some examples, even if the obtained security information asset was masked when obtained, a re-masking may be performed by the randomizing engine. In some examples, masking and/or re-masking is performed before randomization. In other examples, masking and/or re-masking is performed after randomization.

At block 306, the process 300 includes providing the randomized security information asset to a secure storage device (e.g., the secure storage device 116 of FIG. 1). In some examples, the randomized security asset is provided by a randomizing engine (e.g., the randomizing engine 114 of FIG. 1). The randomized security asset may or may not have been subjected to a masking and/or re-masking prior to transmission. In some examples, providing the randomized security information asset includes transmitting portions (e.g., bytes) of a security information asset such that the order or the portions is randomized for the transmission, but may be stored in the correct order by the secure storage device.

In some aspects, while being stored at a secure storage device, the security asset is subjected to a period re-masking. In some cases, the re-masking procedure is initiated when a usage threshold for the security information asset is exceeded. In some examples, the re-masking procedure is initiated based on a determination that one or more bytes of the security information asset have a usage quantity that exceeds a usage discrepancy threshold relative to one or more other bytes of the security information asset. In some cases, based on determining that a usage discrepancy threshold is exceeded for one or more bytes of the security information asset, usage of the security information asset may be canceled.

At block 308, the process 300 includes obtaining the randomized security information asset from the secure storage device (e.g., the secure storage device 116 of FIG. 1). In some examples, the randomized security information asset is obtained by a randomizing engine (e.g., the randomizing engine 114 of FIG. 1). In some aspects, as discussed above, the randomized security information asset may have been re-masked any number of times while being stored in the secure storage device prior to being obtained by the randomizing engine from the secure storage device. In some examples, the randomized security information asset is randomized in regards to the order of portions of the security information during transmission from the secure storage device to the randomizing engine.

At block 310, the process 300 includes performing a second randomization of the security information asset to obtain an updated randomized security information asset. In some aspects, the second randomization is performed by a randomizing engine (e.g., the randomizing engine 114 of FIG. 1). In some examples, similar to the above description of block 304, the randomized security asset may or may not be subjected to a masking and/or re-masking before or after the second randomization. In some cases, the second randomization randomizes the order of transmission of portions (e.g., bytes).

At block 312, the process 300 includes providing the updated randomized security information asset to a security component (e.g., security components 118, 120 of FIG. 1), wherein the updated randomized security information asset is used to perform a security operation. In some examples, the security component is aware of any randomization or masking applied to the security information asset, such that the security information asset may be recovered for use. In some examples, the security information asset may then be used to perform a security operation (e.g., encryption, decryption, additional cryptographic key derivation, any other steps and or transformations performed using a security information asset, etc.).

In some examples, the process 300, or any other process described herein may be performed by a computing device or apparatus, and/or one or more components therein and/or to which the computing device is operatively connected. As an example, the process 300 may be performed wholly or in part by the randomizing engine 114 shown in FIG. 1 and described above, or any other component of the secure execution environment 112 shown in FIG. 1 and described above, and/or the computing system 400 shown in FIG. 4 and described below (or any one or more components therein).

A computing device, may be, include, or be a component of any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, a smart speaker, a voice assistant device, a SoC, and/or any other device with the resource capabilities to perform the processes described herein, including the process 300, and/or other process described herein. In some cases, a computing device or apparatus (e.g., that includes a hardware identity impersonator) may include various components, such as one or more input devices, one or more output devices, one or more processors, one or more microprocessors, one or more microcomputers, one or more cameras, one or more sensors, and/or other component(s) that are configured to carry out the operations of processes described herein. In some examples, the computing device may include a display, a network interface configured to communicate and/or receive the data, an RF sensing component, any combination thereof, and/or other component (s). The network interface may be configured to communicate and/or receive Internet Protocol (IP) based data or other type of data.

The components of a computing device (e.g., the computing device 100 of FIG. 1) may be implemented, at least in part, in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), finite state machines, and/or other suitable electronic circuits), and/or can include and/or be implemented, at least in part, using computer software, firmware, or any combination thereof, to perform the various operations described herein.

The process 300 shown in FIG. 3 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types.

The order in which the operations are described is not intended to be construed as a limitation, and any number of the described operations can be combined in any order and/or in parallel to implement the processes.

Additionally, the process 300, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 4:
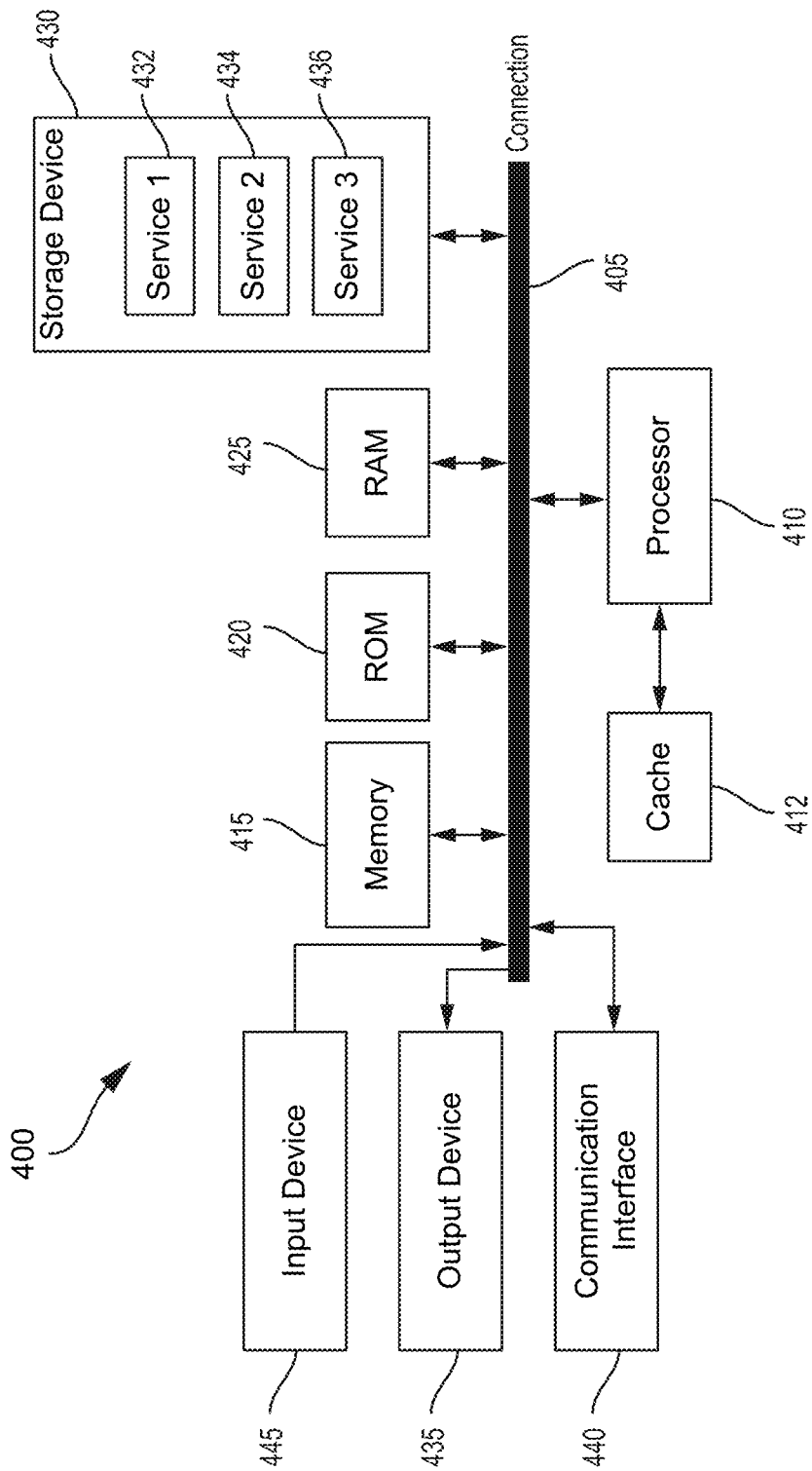
FIG. 4 is a diagram illustrating an example of a computing system for implementing certain aspects described herein.

FIG. 4 is a diagram illustrating an example of a system for implementing certain aspects of the present technology. In particular, FIG. 4 illustrates an example of computing system 400, which can be for example any computing device making up internal computing system, a remote computing system, a camera, or any component thereof in which the components of the system are in communication with each other using connection 405. Connection 405 can be a physical connection using a bus, or a direct connection into processor 410, such as in a chipset architecture. Connection 405 can also be a virtual connection, networked connection, or logical connection.

In some examples, computing system 400 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache 412 of high-speed memory connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms or sensors, such as a microphone for speech (e.g., a user speaking), a touch-sensitive screen for gesture or graphical input (e.g., a user performing sign language symbols, a user shaking a phone, etc.), keyboard (e.g., a user pressing a key), mouse, motion input, a determination that a user is in a location indicated by a positioning system or modem sub-system, etc., which may be used to activate counters described in previous sections and enable/disable the asset transmission chain at any stage previously described. Computing system 400 can also include output device 435, which can be one or more of a number of output mechanisms. In some instances, multi-modal systems can enable a user to provide multiple types of input/output to communicate with computing system 400. Computing system 400 can include communications interface 440, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 440 may also include one or more Global Navigation Satellite System (GNSS) receivers or transceivers that are used to determine a location of the computing system 400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash storage, memristor memory, any other solid-state memory, a compact disc read only memory (CD-ROM) optical disc, a rewritable compact disc (CD) optical disc, digital video disk (DVD) optical disc, a blu-ray® disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof. The storage device 430 can include software instructions or code that can be executed by the processor 410 to cause the system 400 to perform a function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples and examples provided herein. However, it will be understood by one of ordinary skill in the art that the examples may be practiced without these specific details. For clarity of explanation, in some instances the present technology may be presented as including individual functional blocks including functional blocks comprising devices, device components, operations, steps, or routines in a method embodied in software, hardware, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smartphones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm operations described in connection with the examples disclosed herein may be implemented as electronic hardware, computer software, firmware, or combinations thereof. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Aspects of the Disclosure Include:

Aspect 1: A method for information protection, the method comprising: obtaining a security information asset at a randomizing engine; performing a first randomization of the security information asset to obtain a randomized security information asset; providing the randomized security information asset to a secure storage device; obtaining the randomized security information asset from the secure storage device; performing a second randomization of the security information asset to obtain an updated randomized security information asset; and providing the updated randomized security information asset to a security component, wherein the updated randomized security information asset is used to perform a security operation.

Aspect 2: The method of aspect 1, wherein the security information asset is a cryptographic key.

Aspect 3: The method of any of aspects 1 or 2, wherein the security information asset is obtained in a masked form, and the method further comprises: performing a re-masking of the security information asset to obtain a re-masked security information asset, wherein the first randomization is performed using the re-masked security information asset.

Aspect 4: The method of any of aspects 1 to 3, wherein the security information asset is obtained in an unmasked form, and the method further comprises performing a masking of the security information asset to obtain a masked security information asset, wherein the first randomization is performed using the masked security information asset.

Aspect 5: The method of any of aspects 1 to 5, wherein the security information asset is obtained from a security information asset storage device.

Aspect 6: The method of any of aspects 1 to 5, wherein the updated randomized security information asset is used to derive an additional security information asset for use in performing a security operation.

Aspect 7: The method of any of aspects 1 to 6, wherein the updated randomized security information asset, prior to being provided to the security component, is augmented to include additional information about a processing history of the security information asset and a security policy specifying allowed operations and one or more entities authorized to interact with the security information asset.

Aspect 8: The method of any of aspects 1 to 7, further comprising: enforcing, at the secure storage device, a re-masking procedure for the randomized security information asset.

Aspect 9: The method of any of aspects 1 to 8, wherein the re-masking procedure is initiated when a usage threshold for the security information asset is exceeded.

Aspect 10: The method of any of aspects 1 to 9, wherein the re-masking procedure is initiated based on a determination that one or more bytes of the security information asset have a usage quantity that exceeds a usage discrepancy threshold relative to one or more other bytes of the security information asset.

Aspect 11: The method of any of aspects 1 to 10, further comprising: determining that a usage discrepancy threshold is exceeded for one or more bytes of the security information asset; and canceling usage of the security information asset based on the determination.

Aspect 12: The method of any of aspects 1 to 11, wherein the randomizing engine is included in a secure execution environment.

Aspect 13: The method of any of aspects 1 to 12, wherein the security component is a cryptographic engine.

Aspect 14: The method of any of aspects 1 to 13, wherein the security component is a key table.

Aspect 15: The method of any of aspects 1 to 14, wherein the security component is a key derivation function.

Aspect 16: An apparatus for information protection, the apparatus comprising: at least one memory; and at least one processor coupled to the at least one memory and configured to: obtain a security information asset at a randomizing engine; perform a first randomization of the security information asset to obtain a randomized security information asset; provide the randomized security information asset to a secure storage device; obtain the randomized security information asset from the secure storage device; perform a second randomization of the security information asset to obtain an updated randomized security information asset; and provide the updated randomized security information asset to a security component, wherein the updated randomized security information asset is used to perform a security operation.

Aspect 17: The apparatus of aspect 16, wherein the security information asset is a cryptographic key.

Aspect 18: The apparatus of aspects 16 or 17, wherein the security information asset is obtained in a masked form, and the processor is further configured to: perform a re-masking of the security information asset to obtain a re-masked security information asset, wherein the first randomization is performed using the re-masked security information asset.

Aspect 19: The apparatus of any of aspects 16 to 18, wherein the security information asset is obtained in an unmasked form, and the processor is further configured to: perform a masking of the security information asset to obtain a masked security information asset, wherein the first randomization is performed using the masked security information asset.

Aspect 20: The apparatus of any of aspects 16 to 19, wherein the security information asset is obtained from a security information asset storage device.

Aspect 21: The apparatus of any of aspects 16 to 20, wherein the updated randomized security information asset is used to derive an additional security information asset for use in performing a security operation.

Aspect 22: The apparatus of any of aspects 16 to 21, wherein the updated randomized security information asset, prior to being provided to the security component, is augmented to include additional information about a processing history of the security information asset and a security policy specifying allowed operations and one or more entities authorized to interact with the security information asset.

Aspect 23: The apparatus of any of aspects 16 to 22, wherein the processor is further configured to: enforce, at the secure storage device, a re-masking procedure for the randomized security information asset.

Aspect 24: The apparatus of any of aspects 16 to 23, wherein the re-masking procedure is initiated when a usage threshold for the security information asset is exceeded.

Aspect 25: The apparatus of any of aspects 16 to 24, wherein the re-masking procedure is initiated based on a determination that one or more bytes of the security information asset have a usage quantity that exceeds a usage discrepancy threshold relative to one or more other bytes of the security information asset.

Aspect 26: The apparatus of any of aspects 16 to 25, wherein the processor is further configured to: determine that a usage discrepancy threshold is exceeded for one or more bytes of the security information asset; and cancel usage of the security information asset based on the determination.

Aspect 27: The apparatus of any of aspects 16 to 26, wherein the randomizing engine is included in a secure execution environment.

Aspect 28: The apparatus of any of aspects 16 to 27, wherein the security component is a cryptographic engine.

Aspect 29: The apparatus of any of aspects 16 to 28, wherein the security component is a key table.

Aspect 30: The apparatus of any of aspects 16 to 29, wherein the security component is a key derivation function.

Aspect 31. A non-transitory computer-readable medium having stored thereon instructions that, when executed by at least one processor, cause the at least one processor to perform operation according to any of Aspects 1 to 15.

Aspect 32. An apparatus for information protection, comprising one or more means for performing operations according to any of Aspects 1 to 15.

What is claimed is:

1. A method for information protection, the method comprising:
    obtaining a security information asset at a randomizing engine;
    performing a first randomization of the security information asset to obtain a randomized security information asset;
    providing the randomized security information asset to a secure storage device;
    obtaining the randomized security information asset from the secure storage device;
    performing a second randomization of the security information asset to obtain an updated randomized security information asset, wherein the second randomization of the security information asset randomizes the randomized security information asset obtained from the secure storage device;
    providing the updated randomized security information asset to a security component, wherein the updated randomized security information asset is used to perform a security operation; and
    enforcing, at the secure storage device, a re-masking procedure for the randomized security information asset, wherein the re-masking procedure is initiated based on a determination that one or more bytes of the security information asset have a usage quantity that exceeds a usage discrepancy threshold relative to one or more other bytes of the security information asset.

2. The method of claim 1, wherein the security information asset is a cryptographic key.

3. The method of claim 1, wherein the security information asset is obtained in a masked form, and the method further comprises: performing a re-masking of the security information asset to obtain a re-masked security information asset, wherein the first randomization is performed using the re-masked security information asset.

4. The method of claim 1, wherein the security information asset is obtained in an unmasked form, and the method further comprises performing a masking of the security information asset to obtain a masked security information asset, wherein the first randomization is performed using the masked security information asset.

5. The method of claim 1, wherein the security information asset is obtained from a security information asset storage device.

6. The method of claim 1, wherein the updated randomized security information asset is used to derive an additional security information asset for use in performing a security operation.

7. The method of claim 1, wherein the updated randomized security information asset, prior to being provided to the security component, is augmented to include additional information associated with a processing history of the security information asset and a security policy specifying allowed operations and one or more entities authorized to interact with the security information asset.

8. The method of claim 1, wherein the re-masking procedure is initiated further based on a determination that a usage threshold for the security information asset is exceeded.

9. The method of claim 1, further comprising:
determining that the usage discrepancy threshold is exceeded for one or more bytes of the security information asset; and
canceling usage of the security information asset based on the determination.

10. The method of claim 1, wherein the randomizing engine is included in a secure execution environment.

11. The method of claim 1, wherein the security component is a cryptographic engine.

12. The method of claim 1, wherein the security component is a key table.

13. The method of claim 1, wherein the security component is a key derivation function.

14. An apparatus for information protection, the apparatus comprising:
at least one memory; and
at least one processor coupled to the at least one memory and configured to:
obtain a security information asset at a randomizing engine;
perform a first randomization of the security information asset to obtain a randomized security information asset;
provide the randomized security information asset to a secure storage device;
obtain the randomized security information asset from the secure storage device;
perform a second randomization of the security information asset to obtain an updated randomized security information asset, wherein the second randomization of the security information asset randomizes the randomized security information asset obtained from the secure storage device;
provide the updated randomized security information asset to a security component, wherein the updated randomized security information asset is used to perform a security operation; and
enforce, at the secure storage device, a re-masking procedure for the randomized security information asset, wherein the re-masking procedure is initiated based on a determination that one or more bytes of the security information asset have a usage quantity that exceeds a usage discrepancy threshold relative to one or more other bytes of the security information asset.

15. The apparatus of claim 14, wherein the security information asset is a cryptographic key.

16. The apparatus of claim 14, wherein the security information asset is obtained in a masked form, and the at least one processor is further configured to: perform a re-masking of the security information asset to obtain a re-masked security information asset, wherein the first randomization is performed using the re-masked security information asset.

17. The apparatus of claim 14, wherein the security information asset is obtained in an unmasked form, and the at least one processor is further configured to: perform a masking of the security information asset to obtain a masked security information asset, wherein the first randomization is performed using the masked security information asset.

18. The apparatus of claim 14, wherein the security information asset is obtained from a security information asset storage device.

19. The apparatus of claim 14, wherein the updated randomized security information asset is used to derive an additional security information asset for use in performing a security operation.

20. The apparatus of claim 14, wherein the updated randomized security information asset, prior to being provided to the security component, is augmented to include additional information associated with a processing history of the security information asset and a security policy specifying allowed operations and one or more entities authorized to interact with the security information asset.

21. The apparatus of claim 14, wherein the re-masking procedure is initiated further based on a determination that a usage threshold for the security information asset is exceeded.

22. The apparatus of claim 14, wherein the at least one processor is further configured to:
determine that the usage discrepancy threshold is exceeded for one or more bytes of the security information asset; and
cancel usage of the security information asset based on the determination.

23. The apparatus of claim 14, wherein the randomizing engine is included in a secure execution environment.

24. The apparatus of claim 14, wherein the security component is a cryptographic engine.

25. The apparatus of claim 14, wherein the security component is a key table.

26. The apparatus of claim 14, wherein the security component is a key derivation function.

27. The apparatus of claim 14, wherein the apparatus comprises a wireless communication device.

28. A non-transitory computer-readable medium storing computer executable code, the computer executable code, when executed by at least one processor, causes the at least one processor to:
 obtain a security information asset at a randomizing engine;
 perform a first randomization of the security information asset to obtain a randomized security information asset;
 provide the randomized security information asset to a secure storage device;
 obtain the randomized security information asset from the secure storage device;
 perform a second randomization of the security information asset to obtain an updated randomized security information asset, wherein the second randomization of the security information asset randomizes the randomized security information asset obtained from the secure storage device;
 provide the updated randomized security information asset to a security component, wherein the updated randomized security information asset is used to perform a security operation; and
 enforce, at the secure storage device, a re-masking procedure for the randomized security information asset, wherein the re-masking procedure is initiated based on a determination that one or more bytes of the security information asset have a usage quantity that exceeds a usage discrepancy threshold relative to one or more other bytes of the security information asset.

29. The non-transitory computer-readable medium of claim 28, wherein the security information asset is obtained in a masked form, and the computer executable code further causes the at least one processor to: perform a re-masking of the security information asset to obtain a re-masked security information asset, wherein the first randomization is performed using the re-masked security information asset.

30. The non-transitory computer-readable medium of claim 28, wherein the security information asset is obtained in an unmasked form, and the computer executable code further causes the at least one processor to: perform a masking of the security information asset to obtain a masked security information asset, wherein the first randomization is performed using the masked security information asset.

* * * * *